(No Model.)
F. M. ALLENBAUGH, Sr. & W. H. ALLENBAUGH, Jr.
INSECT CATCHER.
No. 555,916. Patented Mar. 10, 1896.
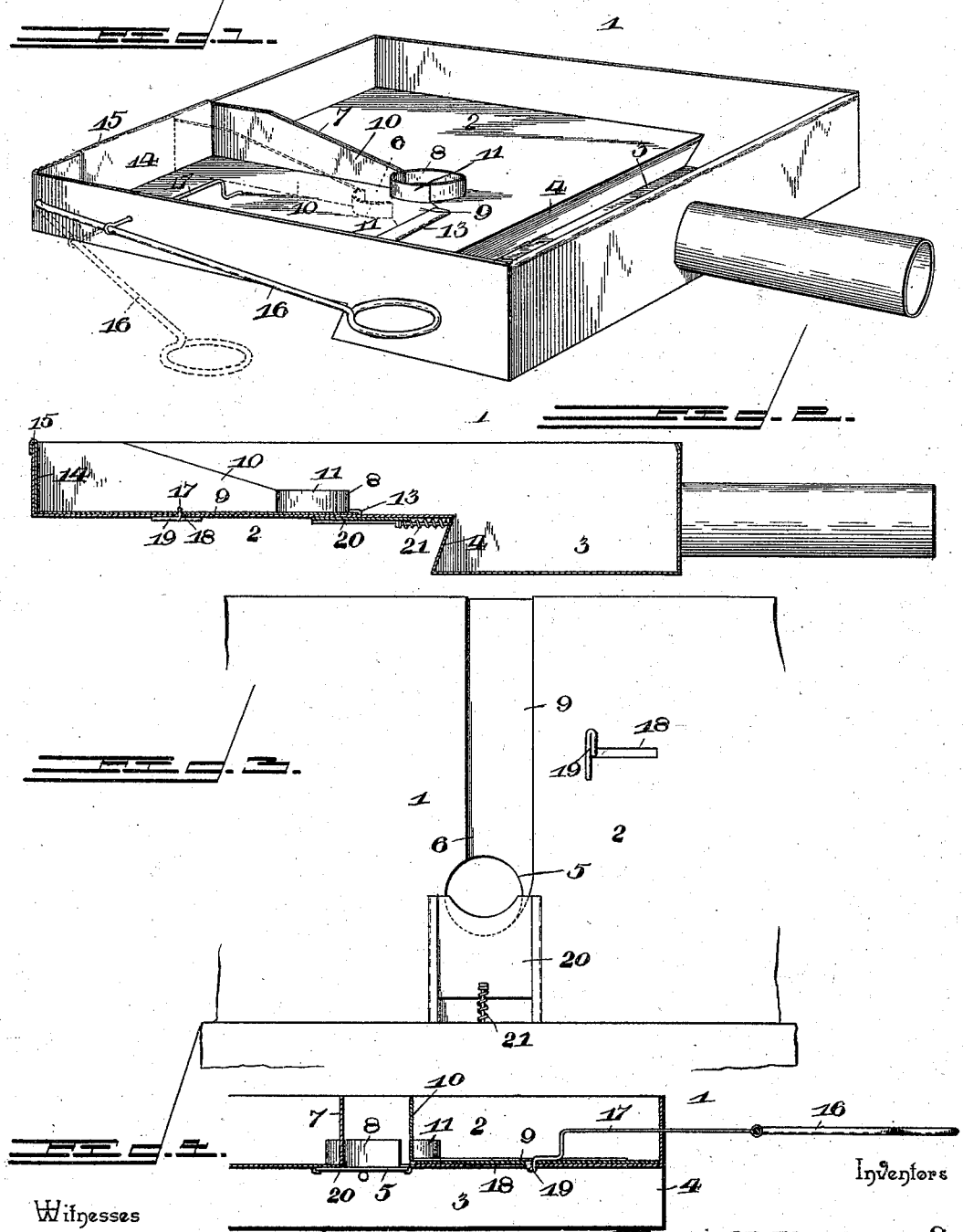
Witnesses
Inventors
Francis M. Allenbaugh Sr.
William H. Allenbaugh Jr.
By their Attorneys, C. A. Snow & Co.

UNITED STATES PATENT OFFICE.

FRANCIS MARION ALLENBAUGH, SR., AND WILLIAM HENRY ALLENBAUGH, JR., OF GREENUP, ILLINOIS.

INSECT-CATCHER.

SPECIFICATION forming part of Letters Patent No. 555,916, dated March 10, 1896.

Application filed December 26, 1895. Serial No. 573,391. (No model.)

*To all whom it may concern:*

Be it known that we, FRANCIS MARION ALLENBAUGH, Sr., and WILLIAM HENRY ALLENBAUGH, Jr., citizens of the United States, residing at Greenup, in the county of Cumberland and State of Illinois, have invented a new and useful Insect-Catcher, of which the following is a specification.

The invention relates to improvements in insect-catchers.

The object of the present invention is to provide a simple and efficient device for capturing insects collecting on corn and similar plants, and to enable such insects to be readily handled for destroying them.

A further object of the invention is to provide a catcher designed to operate on corn having a single stalk, broom-corn having a plurality of stalks, and also on hill-corn where a number of stalks are planted, and adapted to be readily adjusted to suit the size of a stalk, and capable of being readily transferred from one stalk to another to enable the operator to capture the insects on a large area of corn in a comparatively short time.

The invention consists in the construction and novel combination and arrangement of parts hereinafter fully described, illustrated in the accompanying drawings, and pointed out in the claims hereto appended.

In the drawings, Figure 1 is a perspective view of an insect-catcher constructed in accordance with this invention, the slide being shown closed in full lines and open in dotted lines. Fig. 2 is a longitudinal sectional view. Fig. 3 is a reverse plan view of a portion of the catcher, showing the form of the entrance-slot and the opening and illustrating the construction of the adjustable plate. Fig. 4 is a detail view taken transversely of the catcher.

Like numerals of reference designate corresponding parts in all the figures of the drawings.

1 designates a pan or receptacle having a shallow portion 2 and provided with a portion 3 of increased depth. The pan is constructed of sheet metal or other suitable material having a glazed surface sufficient to prevent insects from climbing its walls, and the inner wall 4 of the depending portion 3 of the pan is inclined and extends under the front shallow portion 2. The pan is provided at its edges with vertical walls, and it has at its shallow portion a central stalk-receiving opening 5 and a longitudinal slot 6 communicating with the central opening 5 and adapted to permit a pan to be placed around a stalk. The pan is provided at one side of the slot 6 with a vertical flange 7, which has a curved extension 8 at its inner end extending partially around the central opening 5, and at the opposite side of the slot or opening is arranged a movable slide 9, having at its inner ends a corresponding longitudinally-disposed flange 10 with a curved extension 11. When the slide is closed, as illustrated in full lines in Fig. 1 of the accompanying drawings, the flange 11 fits against the flange 7 of the pan and the entrance-slot is closed and the curved extensions of the flanges 7 and 11 form a circular flange around the central opening 5.

The inner transverse edge of the slide is arranged in a suitable way 13, and the slide is provided at its front edge with a vertical flange 14, which is bent over upon the adjacent wall of the pan at 15. The slide is operated by a lever 16, fulcrumed at its front end on the exterior of the pan and provided at its rear end with a loop or handle and connected with the slide by a rod 17, which passes through a perforation of the adjacent side wall of the pan and which has its inner end extended through a perforation of the slide and arranged in a transverse slot 18 of the shallow portion of the pan and provided with a head 19. The head 19 is disposed transversely of the slide and may be constructed in any suitable manner, and it serves to lock the slide on the bottom of the pan.

The opening 5 of the device may be varied in size by means hereinafter described to adapt the device to stalks of different sizes, and the insect-catcher is capable of operating on ordinary corn having a single stalk, on broom-corn having a plurality of stalks, and also on hill-corn where a number of stalks is planted.

In order to vary the size of the central opening 5 to adjust the catcher to stalks of different sizes, a plate 20 is mounted on the lower face of the shallow portion of the pan in rear of or at the inner side of the central opening 5, and is provided with a curved recess adjacent to the central opening of the pan. The plate 20 is yieldingly mounted, and is actuated by a spring 21 and is adapted to automatically conform to the sides of the stalk.

In applying the catcher to a stalk, the slide is moved outward and a stalk inserted through the entrance-slot and arranged in the central opening. The slide is then closed and the pan extends entirely around the stalk, and the insects may then be brushed into the pan or shaken from the stalk or dislodged in any suitable manner. The catcher is then removed from the stalk by opening the slide and placed around another stalk, and the operation of collecting the insects is continued until the pan is filled. The insects are shaken into the inner portion 3 of the pan, and may be readily emptied into a pot or other receptacle, and can then be destroyed by hot water or any other suitable means.

It will be seen that the catcher is exceedingly simple and inexpensive in construction, that it is positive and reliable in operation, and that it will enable an operator to rapidly remove the insects from corn and the like. It will also be apparent that the catcher may be readily adjusted to suit the size of a cornstalk, that it may be quickly applied to and removed therefrom, and that it is capable of operating on corn having a single stalk or a plurality of stalks.

Changes in the form, proportion, and minor details of construction may be resorted to without departing from the principle or sacrificing any advantages of the invention.

What we claim is—

1. An insect-catcher comprising a receptacle having a stalk-receiving opening and provided with an entrance-slot communicating with the same and extending therefrom to the edge of the pan, and a slide mounted on the pan and arranged to close the entrance-slot to complete the pan after a stalk has been arranged in the opening, substantially as and for the purpose described.

2. An insect-catcher comprising a receptacle provided with an opening and having an entrance-slot communicating with the same, and provided at one side of the entrance-slot with a vertical flange having a curved extension at its inner extremity extending around one side of the opening, and a slide mounted on the pan and provided with a vertical flange similar to that of the pan and adapted to abut against the same to close the entrance-opening and having a curved extension co-operating with that of the other flange to form a flange around the circular opening, substantially as described.

3. An insect-catcher comprising a pan provided with an opening and having an entrance-slot and provided at one side of the slot and the opening with a flange, a slide mounted on the pan and provided with a corresponding flange and adapted to close the entrance-slot, and a yieldingly-mounted plate arranged on the lower face of the pan and located adjacent to the opening thereof and adapted to contract the same, substantially as described.

4. An insect-catcher comprising a pan having a shallow front portion and a deepened depending inner or rear portion, and provided with a depending transverse wall extending beneath the front portion of the pan, said pan being provided with an opening and an entrance-slot, and means for closing the entrance-slot after a stalk has been arranged in the opening, substantially as described.

5. An insect-catcher comprising a pan having an entrance-slot and provided with an opening at the inner extremity thereof, a slide mounted on the pan and adapted to close the entrance-slot, an operating-lever fulcrumed on the pan at one side thereof, and a rod connected with the operating-lever and extending through the perforation of the adjacent side of the pan and connected at its inner end with a slide, the inner end of the rod being extended through the slide and arranged in a transverse slot of the pan, and provided with a head spanning the slot and arranged on the lower face of the pan, substantially as described.

In testimony that we claim the foregoing as our own we have hereto affixed our signatures in the presence of two witnesses.

FRANCIS MARION ALLENBAUGH, Sr.
WILLIAM HENRY ALLENBAUGH, Jr.

Witnesses:
ROBERT C. WILLIS,
RANDOLPH G. HALL.